Patented Sept. 9, 1924.

1,507,987

UNITED STATES PATENT OFFICE.

HUGH SPENCER COOPER, OF CLEVELAND, OHIO, ASSIGNOR TO KEMET LABORATORIES COMPANY, INC., A CORPORATION OF NEW YORK.

PROCESS OF PREPARING OXY COMPOUNDS OF TANTALUM.

No Drawing.   Application filed June 8, 1922. Serial No. 566,858.

*To all whom it may concern:*

Be it known that I, HUGH S. COOPER, a citizen of the United States, residing at Cleveland, in the county of Cuyahoga and State of Ohio, have invented certain new and useful Improvements in Processes of Preparing Oxy Compounds of Tantalum, of which the following is a specification.

This invention is a process for the preparation of high grade tantalum oxid from materials in which the tantalum is associated with iron. Such materials are fairly cheap and abundant and are therefore preferred, as my invention provides for the removal of the iron, permitting the ultimate production of a white or nearly white oxid.

The invention includes the conversion of the tantalum into chlorid which is then hydrolized into tantalic acid, the latter being ignited to oxid if desired. The ferric chlorid formed from the iron in the starting material will contaminate the tantalum chlorid initially formed, but this iron is removed with substantial completeness during the process, all as more fully hereinafter described, and as claimed.

My preferred starting material is ferrotantalum containing, for example, about 80% Ta, as this is substantially free from certain impurities normally associated with tantalum in nature. Tantalite and similar oxid ores may, however, be employed.

The raw material is first treated with chlorin at a temperature above 450° C. and preferably between 500° C. and 650° C. If tantalite or a similar oxid ore is used as raw material, this is pulverized and mixed with carbon before the chlorination to assist in the reduction. The mixed chlorids of tantalum and iron sublime and are collected in a suitable receiver.

I have found that if water is added to the freshly prepared chlorids to hydrolyze the tantalum chlorid, the reaction is violent and much heat is evolved, and insoluble basic iron compounds are formed and occluded in the initially gelatinous tantalic acid in such manner as to prevent their subsequent removal. Accordingly, I find it necessary to effect the initial stages of hydration and hydrolysis in the presence of a deficiency of water and under conditions permitting the ready dissipation of heat. When hydration and hydrolysis have passed a certain stage, an excess of water may be added to the material without undue formation of basic iron compounds.

The preliminary treatment of the mixed chlorids may be conveniently accomplished by simply exposing the mixed chlorids in a thin layer to the action of air. Water vapor will be gradually absorbed and the hydration of the ferric chlorid will be manifested by the appearance of a characteristic yellow color, which may be used to indicate the progress of the action. An exposure of from 10 to 12 hours is usually sufficient.

When the open air hydration has reached the desired stage, the mixed chlorids are stirred into water. For the reason already stated, the water should preferably be cold and the chlorids added slowly, as these precautions, in addition to the open air treatment, favor the formation of a product having a minimum iron content. Treatment with cold water hydrolyzes perhaps 80% of the entire tantalum content of the mixed chlorids and a further portion is caused to hydrolyze by boiling the mixture. For the best results, this boiling should be deferred until the bulk of the tantalum chlorid is hydrolyzed, and the water should be acidified before the boiling. A suitable proportion of water to mixed chlorids during the hydrolysis is 3 to 2 weights of water to one weight chlorids.

In acidifying the water before boiling, I may add hydrochloric or sulfuric acid in quantity sufficient to bring the acidity up to about 5% HCl or 5% $H_2SO_4$. A prolonged boiling with constant agitation is preferred, the solution being concentrated to one-third its original bulk, or, if sulfuric acid was used, to a fluid paste. The concentrated solution containing the tantalum in suspension is then well diluted, allowed to settle, decanted, washed thoroughly by decantation with cold and then hot water, and finally filtered and washed until all soluble compounds are removed.

Sodium chlorid has been found to be equivalent to acids as an iron-hydrolysis-inhibiting agent under certain conditions. After the mixed chlorids have been stirred into cold water, as described, sodium chlorid may be added until the water has a 20% NaCl content, and the mixture then boiled, decanted and washed without addition of acid. Or, the mixed chlorids may be added to a cold 20% NaCl solution which is boiled without addition of acid after the bulk of the tantalum oxid is hydrolyzed.

The washed product obtained by any of the modifications described is dried and ignited to tantalum pentoxid. This may contain columbium, originally associated with the tantalum, but if the process has been properly carried out it will be pure white, or nearly so, and contain not more than 0.20% of iron, the iron content being frequently less than 0.10%.

If any doubt exists regarding the elimination of the iron from the material, a small test sample should be ignited and examined for color. If the presence of iron is indicated, the entire quantity of tantalic acid should be further treated with dilute acid. Once the material has been ignited, the iron is rendered completely insoluble and cannot be removed in any feasible manner.

The process as described includes all the steps which I believe to be preferable when a product having a minimum content of iron is to be prepared. The process may be somewhat simplified for more rapid operation, giving a product which is less pure but good enough for many uses. Such omissions and modifications, within the scope of the appended claims, are within my invention.

I claim:

1. Process of preparing oxy-compounds of tantalum from material containing tantalum and iron, which comprises forming a mixture of the chlorids of tantalum and iron, and then hydrolyzing the tantalum chlorid while inhibitating hydrolysis of the iron chlorid.

2. Process according to claim 1 in which the latter stages of the hydrolysis of the tantalum chlorid is effected with boiling water in the presence of a hydrolysis-inhibiting agent.

3. Process according to claim 1 in which the mixed chlorids are prepared in anhydrous form and are subjected to prolonged exposure to air before actively hydrolyzing.

4. Process of preparing a mixture of tantalum and iron chlorids which comprises treating a material containing tantalum and iron with chlorin at a temperature above 450° C.

5. Process according to claim 4 in which the tantalum-iron material is ferro-tantalum.

6. Process of preparing oxy-compounds of tantalum from an anhydrous mixture of tantalum and iron chlorids, which comprises subjecting the mixed chlorids to the action of water-vapor and then more actively hydrolyzing the tantalum chlorid.

7. Process according to claim 6 in which the water-vapor used in the initial treatment is highly diluted.

8. Process according to claim 6 in which the active hydrolysis comprises a treatment with cold water.

9. Process according to claim 6 in which the active hydrolysis comprises a treatment with cold water followed by a treatment with hot water.

10. Process according to claim 9 in which the hot water treatment is carried out in the presence of a hydrolysis-inhibiting agent.

11. Process according to claim 10 in which the hydrolysis-inhibiting agent is a chlorid.

12. Process according to claim 10 in which the hydrolysis-inhibiting agent is a strong solution of sodium chlorid.

In testimony whereof, I affix my signature.

HUGH SPENCER COOPER.